United States Patent [19]

Brown

[11] Patent Number: 4,808,657

[45] Date of Patent: Feb. 28, 1989

[54] RUBBERY ADHESIVE CEMENTS

[75] Inventor: Robert J. Brown, Cuyahoga Falls, Ohio

[73] Assignee: The Goodyear Tire & Rubber Company, Akron, Ohio

[21] Appl. No.: 914,574

[22] Filed: Oct. 3, 1986

Related U.S. Application Data

[63] Continuation of Ser. No. 587,711, Mar. 8, 1984, abandoned.

[51] Int. Cl.$^4$ .................. C08L 7/00; C08L 9/00; C08L 9/02; C08L 15/02
[52] U.S. Cl. ..................... 524/518; 524/525; 524/526; 525/139; 525/211; 525/232; 525/233; 525/236; 525/237
[58] Field of Search ............... 524/525, 526, 518, 527; 525/236, 237, 211, 232, 233, 235, 139

[56] References Cited

U.S. PATENT DOCUMENTS

| | | | |
|---|---|---|---|
| 3,351,572 | 11/1967 | Jameson | 524/526 |
| 3,359,221 | 12/1967 | Schoenbeck | 524/526 |
| 3,421,565 | 1/1969 | Reinbold | 152/330 R |
| 3,830,880 | 8/1974 | De La Mare | 525/386 |
| 3,935,180 | 1/1976 | Sugiura et al. | 525/236 |
| 3,937,681 | 2/1976 | Nordsiek | 526/173 |
| 3,978,165 | 8/1976 | Stumpe, Jr. et al. | 525/237 |
| 4,060,503 | 11/1977 | Feeney et al. | 524/526 |
| 4,181,635 | 1/1980 | Takamatsu et al. | 534/526 |
| 4,192,366 | 3/1980 | Scriver, Jr. et al. | 525/236 |
| 4,230,841 | 10/1980 | Prudence | 526/179 |
| 4,259,218 | 3/1981 | Haws | 152/359 |

FOREIGN PATENT DOCUMENTS 1261371  1/1972  United Kingdom .

*Primary Examiner*—Allan M. Lieberman
*Attorney, Agent, or Firm*—Marc R. Dion, Sr.

[57] ABSTRACT

There is disclosed laminates containing an adhesive blend, a rubbery adhesive cement as well as a method of using said cement, and products which can be prepared from the use of said cement.

The rubbery adhesive cement comprises:

(A) solvent, and
(B) a vulcanizable rubbery polymer blend dissolved in said solvent wherein said blend is comprised of, based on 100 parts thereof:
 (a) 5 to 50 parts by weight of at least one rubbery conjugated diene polymer having 25% to 55% side chain unsaturation and having a Mooney viscosity of from 80 to 150 ML4 at 100° C. as measured according to ASTM D1646, and correspondingly
 (b) 50 to 95 parts of at least one other rubbery polymer.

13 Claims, No Drawings

RUBBERY ADHESIVE CEMENTS

This is a continuation of application Ser. No 587,711 filed on Mar. 8, 1984, now abandoned.

TECHNICAL FIELD

This invention relates to a rubbery adhesive cement and its use in bonding rubber surfaces to form laminates.

BACKGROUND ART

The use of rubbery adhesive cements for the bonding of rubber surfaces are well known, particularly in the fields of tire manufacturing and tire retreading. It is a common method in tire manufacturing, to apply an unvulcanized tread to a tire carcass by means of coating the bias cut tread ends with a rubbery adhesive cement and mating those ends. In tire retreading operations, either unvulcanized or vulcanized treads or tread-forming strips are applied to used tire carcasses which have been prepared by buffing off the old tread and coating it with a rubbery adhesive cement. Other areas of use are the manufacturing of rubber goods including, but not limited to, airsprings, conveyor belts, power transmission belts, hose, fuel cells, shoe products, rubberized roofing and dunnage bags.

When used in rubber bonding applications, rubbery adhesive cements should provide: (1) good green tack, (2) good green strength, and (3) compound compatibility. Green tack is a measure of the ability of the two mating surfaces to grab quickly and hold together while the item is being built. Given strength is a measure of the ability of the spliced surfaces to remain bonded throughout the aging period prior to vulcanization. Compatibility with the rubber compound provides an adhesive layer interface which exhibits a similar vulcanization rate as the rubber compound. This allows the interface to reach the same state of vulcanization and to exhibit similar dynamic properties, thus reducing the possibility of an opening occurring at the splice. Compatibility is measured by the hot vulcanized adhesion test, described infra.

As tread stock compositions change, there arises a need for new and different adhesive cements.

DISCLOSURE OF THE INVENTION

There is disclosed laminates containing an adhesive blend, a rubbery adhesive cement as well as a method of using said cement, and products which can be prepared from the use of said cement.

The rubbery adhesive cement comprises:
(A) solvent and
(B) a vulcanizable rubbery polymer blend dissolved in said solvent wherein said blend is comprised of, based on 100 parts thereof:

(a) 5 to 50, preferably 20 to 35, parts by weight, of at least one rubbery conjugated diene polymer having 25% to 55%, preferably 30% to 50%, side chain unsaturation and having a Money viscosity of from 80 to 150 ML4 at 100° C. measured according to ASTM D1646 and correspondingly (b) 50 to 95, preferably 65 to 80 parts by weight of at least one other rubbery polymer, preferably a diene polymer.

Solvents which may be used in the practice of this invention include any organic solvents capable of dissolving the vulcanizable rubbery polymer blend (hereinafter referred to as rubber blend). The solvents should not appreciably degrade the rubber blend. Exemplary of such organic solvents are hexane, mineral spirits, naphtha, octane, gasoline, rubbermaker's solvent or blends thereof. Generally, the solvent portion of the rubbery adhesive cement comprises 70% to 95% based on the total weight of the cement. More specifically, the level of solvent may better be determined by considering such criteria as ease of application and mode of application. The viscosity of the cement should be low enough to allow smooth application and complete coverage by means of manual or automated applicators. However, it should be sufficiently viscous and concentrated to deposit an effective amount without flowing off the surface to be bonded.

The term "side chain unsaturation", as used herein, means the side chain unsaturation expressed as a percentage of the total polymer as determined by infra-red spectroscopy. More specifically, it relates to the microstructure of polymers wherein the monomer units of the conjugated dienes polymerize by adding across only one of the carbon to carbon double bonds, thus leaving the other double bond pendantly branched from the straight chain portion.

As used herein, polymers containing 25% to 55% side chain unsaturation shall hereinafter be referred to as branched polymers. This should not be construed as excluding lesser amounts of side chain unsaturation from being present in the other rubbery polymers which comprise the rubber blend.

The rubber blend portion of the rubbery adhesive cement is comprised of: the branched polymer; at least one other rubbery polymer, preferably a diene polymer; and other compounding ingredients as are commonly used in the art of producing vulcanizable rubbery adhesive cements.

The branched polymers include homopolymers of conjugated dienes, copolymers of two or more conjugated dienes, and copolymers of one or more conjugated dienes with one or more monomers, e.g. vinyl monomers such as styrene and acrylonitrile, the vinyl monomers usually being present in amounts of 50% or less by weight of the copolymer. In the case of polybutadiene homopolymers or copolymers, the side chain unsaturation is of the 1,2-vinyl structure. In the case of polyisoprene homopolymers or copolymers, the side chain unsaturation is of the 1,2 vinyl structure and/or the 3,4 isopropenyl structure.

The branched polymers which may be used in the practice of the present invention are generally produced by polymerizing conjugated diene monomers or blends thereof using an organolithium catalyst and polymerization techniques as are more fully described in U.S. Pat. No. 4,230,841, U.S. Pat. No. 3,937,681 and U.S. Pat. No. 3,830,880. Preferred is branched polymer, preferably medium-vinyl polybutadiene, containing 25% to 55% side chain unsaturation. More preferred is branched polymer, preferably medium-vinyl polybutadiene, containing 30% to 50% side chain unsaturation, and most preferred is branched polymer, preferably medium vinyl polybutadiene, containing 40% to 50% side chain unsaturation.

Particularly useful are those polymers polymerized to a Mooney viscosity of from 80 to 150 ML4, preferably 90 to 130, more preferably 95 to 125, at 100° C. as measured according to ASTM D1646. As a practical matter, these high Mooney polymers are usually extended with aromatic or naphthenic processing oils to reduce the Mooney viscosity to facilitate processing, particularly where the polymer is reinforced with carbon black. However, the polymers can be used without any oil present. The oil levels used include those typically used in oil extended polymers. These levels vary with the Mooney by the base polymer, i.e., non-extended polymers. The resultant Mooney of the oil extended polymer is preferably, but not limited to 40 to 55 ML at 100° C. as measured according to ATM D1646. Preferred are the branched polymers, preferably medium-vinyl polybutadienes, extended with 20 to 50, more preferably 30 to 45, parts by weight of processing oil per 100 parts by weight of branched polymer.

When a Mooney value is given herein, unless otherwise indicated, it is the Mooney of the polymer with no oil present, e.g., before being extended with an oil. Unless otherwise indicated, where parts by weight of a polymer are referred to herein, it is the parts by weight of the polymer without any extending oil present. For example if a blend requires 25 parts of medium vinyl polybutadiene and the medium vinyl polybutadiene used contains 37.5 parts of oil, approximately 34 parts of the oil extended medium vinyl polybutadiene would be used.

The other rubbery polymers which are used in combination with the branched polymers include, but are not limited to, natural rubber; homopolymers of conjugated dienes such as cis-1,4-polyisoprene and cis-1,4-polybutadiene; copolymers of conjugated dienes such as butadiene and isoprene; rubbery copolymers of a conjugated 1,3-diene such as isoprene and/ore butadiene with up to 50 percent by weight of at least one copolymerizable monomer such as monoolefins, including vinyl monomers, such as styrene and acrylonitrile; polychloroprene; butyl rubber; halobutyl rubber; and rubbery copolymers of monoolefins containing unsaturation, i.e., carbon to carbon double bonds, such as terpolymers of ethylene, propylene and a non-conjugated diene. In a preferred embodiment, the other rubbery polymer is comprised of a blend of natural rubber and/or cis-1,4-polyisoprene, and a rubbery styrene-butadiene copolymer (SBR).

It is preferred that the rubber blend is comprised of 5 to 50, more preferably 20 to 35, parts by weight of medium vinyl polybutadiene; 10 to 35 parts by weight of natural rubber or cis-1,4-polyisoprene; and correspondingly 40 to 60 parts by weight of SBR, all parts being per 100 parts by weight of the rubber blend. Most preferred is a rubber blend comprised of 25 parts by weight of medium-vinyl polybutadiene, 20 parts by weight of natural rubber or cis-1,4-polyisoprene and 55 parts by weight SBR, all parts being per 100 parts by weight of rubber blend.

Other ingredients which are used in compounding the rubber blend of the present invention are those commonly used in formulating vulcanizable compounds. Exemplary of these ingredients are: fillers and reinforcing agents such as clays, silicas, and carbon black; antidegradants which may consist of an antioxidant and an antiozonant; vulcanizing agents such as sulfur, zinc oxide, and accelerators; processing oils; and unreactive tackifying resins.

The rubbery adhesive cement may be prepared by any conventional means such as Banbury mixing and open mill mixing of the rubbery polymer blend portion followed by dissolution of the rubber blend in the solvent in an agitated vessel. The method of combining the ingredients is nor normally critical. However, to prevent premature vulcanization, it is preferred that a multiple-stage mixing system be used wherein the vulcanizing agents are added in the final stage.

The rubbery adhesive cements of the present invention may be applied by any conventional means including the use of brushes, spreaders, rollers and spraying equipment. The cements may be applied to either vulcanized or unvulcanized compounds. The cements may be applied to either one or both of the surfaces to be bonded.

The laminates which are formed by the practice of this invention are comprised of two rubbery surfaces, each surface being either vulcanized or unvulcanized, wherein the surfaces have been adhered together by a film of rubber between the surfaces, the film of rubber being comprised of a rubber blend, based on 100 parts thereof:

(a) 5 to 50 parts by weight of at least one rubbery conjugated diene polymer having 25% to 55% side chain unsaturation, and correspondingly (b) 50 to 95 parts by weight of at least one other rubbery polymer.

The laminates may be prepared by coating at least one surface of the rubber with the rubbery adhesive cement, allowing the cement to dry by evaporation of the solvent, mating the two rubber surfaces and vulcanizing the laminate/rubber film combination. Alternatively, the two rubbery surfaces may be cemented and mated prior to drying the cement, allowing the heat of vulcanization to evaporate the solvent during the vulcanization step. Still another method would be to form an adhesive strip of rubber film by applying a coat of the cement to a non-sticking surface, removing the rubbery film after the solvent has evaporated, then forming the laminate by inserting the adhesive strip between the two rubber surfaces and vulcanizing the combination.

The following examples are intended to illustrate, but not to limit the practice of this invention. All parts shown are parts by weight.

EXAMPLE 1

Rubbery adhesive cements were prepared by mixing the cement formulations shown in Table I. Cements B and D illustrate cements of this invention utilizing a medium-vinyl polybutadiene.

TABLE I

| | CEMENT FORMULATIONS | | | |
| | PARTS | | | |
| Components | Cement A | Cement B | Cement C | Cement D |
|---|---|---|---|---|
| Oil-extended SBR[1] | 76 | 76 | 55 | 55 |
| SBR[2] | — | — | 15 | 15 |
| Cis 1,4-PBD[3] | 25 | — | 25 | — |
| Cis 1,4-polyisoprene[4] | 20 | 20 | 20 | 20 |
| Oil-extended medium-vinyl PBD[5] | — | 34 | — | 34 |
| Carbon black | 62 | 62 | 62 | 62 |
| Processing oil | 16 | 7 | 22 | 13 |
| Antidegradants | 1 | 1 | 1 | 1 |
| Unreactive Phenol Resin | 78 | 78 | 78 | 78 |
| Vulcanizing agents | 10 | 10 | 10 | 10 |
| Gasoline | 2057 | 2057 | 2057 | 2057 |

[1]Emulsion styrene-butadiene extended with 37.5 parts aromatic oil.
[2]Emulsion styrene-butadiene copolymer.
[3]1207 type polybutadiene.
[4]Natural rubber
[5]Medium-vinyl polybutadiene containing 45% vinyl and extended with 37.5 parts aromatic oil.

Each of the cement formulations above were evaluated on each of four different tire tread cmpounds containing the polymer blends shown in Table II, all of which were compounded with conventional compounding ingredients:

TABLE II

TIRE TREAD FORMULATIONS

| Polymer | PARTS Compound | | | |
|---|---|---|---|---|
| | W | X | Y | Z |
| Cis 1,4-polyisoprene | 25 | — | — | — |
| Oil Extended SBR | 55 | 70 | 70 | — |
| Oil Extended Cis 1,4-PBD | 20 | 30 | — | — |
| Cis 1,4-PBD | — | — | 30 | 30 |
| Oil-extended medium-vinyl PBD | — | — | — | 70 |

Test strips of each tire tread compound were cemented together by means of each cement and were tested for green tack, green adhesion and hot vulcanized adhesion.

The green tack test is a measurement of the force required to separate two unvulcanized rubber compounds after they have been cemented and pressed together. A sheet of the rubber compound is applied to a non-elastic backing material. A cement is applied to the rubber compound and allowed to dry. Two test strips are placed in the tackmeter, one on each side of a polyester band to which silicone has been applied. The polyester band has a slit in it 3.175 mm wide, through which the two test strips are contacted. A pressure of 200 kPa is applied to two 15 cm pressure blocks behind each test strip for 30 seconds. The pressure is released and after 5 seconds, the instrument peels the two strips apart at a rate of 25.4 cm per minute. The force required to separate the strips is read from a pen tracing on a chart. The chart is calibrated in dN from 0 to 20. Values beyond the chart limit are shown as 20+.

The green tack was measured on the day the samples were originally made and on samples which had been aged at room temperature for 1, 3 and 6 days. The results are shown in Table III.

TABLE III

| | GREEN TACK, dN | | | |
|---|---|---|---|---|
| | Original | 1 Day | 3 Days | 6 Days |
| Compound W | | | | |
| Cement A | 17.0 | 19.0 | 17.0 | 18.5 |
| Cement B | 20+ | 20+ | 20+ | 20+ |
| Cement C | 13.0 | 17.0 | 18.0 | 15.0 |
| Cement D | 20.0 | 20+ | 20+ | 20+ |
| Compound X | | | | |
| Cement A | 17.0 | 20+ | 18.5 | 18.5 |
| Cement B | 16.0 | 20.0 | 20+ | 19.0 |
| Cement C | 13.5 | 17.0 | 17.0 | 15.5 |
| Cement D | 15.5 | 20+ | 20+ | 20+ |
| Compound Y | | | | |
| Cement A | 16.5 | 18.0 | 17.5 | 16.5 |
| Cement B | 17.0 | 20+ | 20+ | 20+ |
| Cement C | 12.0 | 15.0 | 15.5 | 15.0 |
| Cement D | 17.0 | 20+ | 20+ | 20+ |
| Compound Z | | | | |
| Cement A | 17.5 | 20+ | 16.5 | 19.0 |
| Cement B | 17.5 | 20.0 | 20+ | 20+ |
| Cement C | 12.5 | 20.0 | 16.0 | 18.0 |
| Cement D | 16.0 | 20+ | 20+ | 20+ |

The green adhesion test is used to evaluate adhesive strength. A rubber compound is milled to a thickness of 2.54 mm and a fabric backing is applied. A cement is applied and allowed to dry. Two 100 mm × 100 mm pieces are cut from the sheet and a 25 mm strip of a non-elastic material is applied to one end of each piece. The cemented surfaces of the two pieces are placed in contact with each other and rolled with a rubber roller. The sample is allowed to set for 24 hours under a pressure of 3.5 kPa. Strips, 25 mm wide, are cut from the samples and pulled apart on a conventional tensile tester at 5 cm/min. Two strips are pulled at room temperature and two at 50° C. The force is read in Newtons.

The green adhesion was measured at room temperature and at 50 ® C. The results are shown in Table IV.

TABLE IV

| | GREEN ADHESION, NEWTONS | |
|---|---|---|
| | Room Temperature | 50° C. |
| Compound W | | |
| Cement A | 13.5 | 7.5 |
| Cement B | 23.0 | 5.0 |
| Cement C | 11.0 | 2.5 |
| Cement D | 20.5 | 3.5 |
| Compound X | | |
| Cement A | 14.0 | 7.5 |
| Cement B | 22.5 | 8.5 |
| Cement C | 11.5 | 5.5 |
| Cement D | 19.5 | 8.0 |
| Compound Y | | |
| Cement A | 12.5 | 6.0 |
| Cement B | 20.5 | 6.0 |
| Cement C | 10.5 | 6.0 |
| Cement D | 18.5 | 6.5 |
| Compound Z | | |
| Cement A | 19.5 | 9.0 |
| Cement B | 22.0 | 8.5 |
| Cement C | 17.5 | 7.5 |
| Cement D | 23.5 | 7.5 |

Hot vulcanized adhesion is a test of adhesion where two unvulcanized rubber compound surfaces are cemented and placed in contact through a 5 mm × 50 mm slit in a strip of polyester film. The assembly is then vulcanized. The test strip ends are attached to the jaws of a conventional tensile tester, the jaws being enclosed in an oven which has been preheated to the test temperature. The strips are pulled at a rate of 51 mm per minutes. The force is read in Newtons.

The hot vulcanized adhesion was measured on the day the samples were originally made and on samples which had been aged for 6 days at 70° C. The results are shown in Table V.

TABLE V

| | HOT VULCANIZED ADHESION, NEWTONS | |
|---|---|---|
| | Original | After 6 Days at 70° C. |
| Compound W | | |
| Cement A | 20 | 30 |
| Cement B | 23 | 33 |
| Cement C | 18 | 25 |
| Cement D | 23 | 30 |
| Compound X | | |
| Cement A | 35 | 20 |
| Cement B | 115 | 45 |
| Cement C | 25 | 20 |
| Cement D | 95 | 45 |
| Compound Y | | |
| Cement A | 50 | 18 |
| Cement B | 95 | 25 |
| Cement C | 25 | 18 |
| Cement D | 80 | 40 |
| Compound Z | | |
| Cement A | 50 | 25 |
| Cement B | 80 | 55 |
| Cement C | 30 | 15 |

TABLE V-continued

| HOT VULCANIZED ADHESION, NEWTONS | | |
|---|---|---|
| | Original | After 6 Days at 70° C. |
| Cement D | 75 | 60 |

As is seen from the foregoing data, Cements B and D, which are representative of the best mode of the present invention, provided improved green tack, green adhesion and hot vulcanized adhesion. Although still useful as adhesive cements, two areas in tread splice cementing where the rubbery adhesive cements of the present invention have shown little or no improvement were on tread stocks containing greater than 40 parts natural rubber per 100 parts of total polymer and those containing 70 parts or more carbon black per 100 parts of total polymer.

EXAMPLE 2

Following the procedure as shown in Example 1, rubbery adhesive cement is produced by substituting a copolymer of styrene and butadiene containing 43% side chain unsaturation for the medium-vinyl polybutadiene. The cement is applied to the various tread compounds of Example 1 and adequate green tack, green adhesion and hot vulcanized adhesion are obtained.

EXAMPLE 3

Following the procedures as shown in Example 1, a rubbery adhesive cement is produced by substituting a polyisoprene containing side chain unsaturation for the medium-vinyl polybutadiene. The cement is applied to the various tread compounds of Example 1 and adequate green tack, green adhesion and hot vulcanized adhesion are obtained.

Industrial Applicability

The following illustrate, but do not limit the industrial application of the cements of the present invention. A wide variety of rubber to rubber laminates can profit by the use of the adhesive composition of the present invention.

The rubber surfaces which are laminated together can both be vulcanized, or both unvulcanized, or one vulcanized and the other unvulcanized. The rubber surfaces can be comprised of any conventional rubbers which can be compounded in any conventional manner with conventional compounds.

Rubbery adhesive cements of the present invention may be used in tire building applications for cementing the mating ends of extruded treads or any other areas requiring a rubber to rubber bond. More advantageously in tread splicing applications, it has been found that the use of the cement of the present invention permits its application to only one end of smaller tire treads such as are used for passenger size tires. This precludes the need for an operator to lift the extruded tread in order to apply the cement to the bias cut end which faces downward.

While one-end cementing is normally successful for passenger tire treads, it is often necessary to apply the cement to both ends of the heavier treads such as are used in truck tires. This is because the weight of those treads has a tendency to pull the splice apart. Use of the disclosed cement, however, has been found to eliminate the need to use a restraining band around truck tire treads to prevent splice opening as can occur with some prior art cements.

Any tire tread stock will benefit by the use of the adhesive cement of the present invention. Polymers which may be used in the treads include, but are not limited to, natural rubber and rubbery homopolymers and homopolymers of dienes, particularly, conjugated dienes such as butadiene-1,3 and isoprene as well as copolymers of dienes with vinyl monomers such as acrylonitrile and styrene. Particular polymers include, but are not limited to medium vinyl polybutadiene cis-1,4 polybutadiene, polyisoprene, rubbery butadiene/styrene copolymers and rubbery butadiene/acrylonitrile copolymers. Blends of polymers can also be used.

Other areas of applicability include those where two or more layers of rubber are bonded to form a laminate. Such uses include the bonding of lap splices in conveyor belts, the bonding of successive layers of fabric or polymers in hose manufacture, the bonding of lap splices in rubber roofing applications and the application of either unvulcanized or vulcanized treads or tread strips in tire retreading operations. Again any conventional rubbers will benefit by the use of this adhesive.

While certain representative embodiments and details have been shown for the purpose of illustrating the invention, it will be apparent to those skilled in this art that various changes and modifications may be made therein without departing from the scope of the invention.

What is claimed is:

1. A rubbery adhesive cement comprising:
   (A) a solvent amenable to ready evaporation,
   (B) a vulcanizable rubbery polymer blend dissolved in said solvent wherein said blend is comprised of, based on 100 parts thereof;
      (a) 5 to 50 parts by weight of at least one rubbery conjugated diene polymer having 25% to 55% side chain unsaturation and having a Mooney viscosity of from 80 to 150 ML4 at 100° C. as measured according to ATM D1646, and correspondingly
      (b) 50 to 95 parts by weight of at least one other rubbery polymer and
      (c) an unreactive tackifying resin in an amount effective to contribute to the desired adhesiveness of said rubbery adhesive cement.

2. The rubbery adhesive cement according to claim 1 wherein (a) is selected from the group consisting of: a homopolymer of a medium-vinyl polybutadiene; a homopolymer of isoprene containing 3,4 isopropenyl and 1,2 vinyl structures; a rubbery copolymer of styrene and butadiene with 1,2 vinyl structure on the butadiene portion; and a rubbery copolymer of styrene and isoprene with 3,4 isopropenyl and 1,2 vinyl structures on the isoprene portion.

3. The rubbery adhesive cement according to claim 2 wherein (a) is medium-vinyl polybutadiene and (b) is selected from the group consisting of: natural rubber; cis-1,4-polyisoprene; cis-1,4-polybutadiene; rubbery copolymers of styrene and butadiene; rubbery copolymers of acrylonitrile and butadiene; polychloroprene; butyl rubber; halobutyl rubber; and terpolymers of ethylene, propylene and a nonconjugated diene.

4. The rubbery adhesive cement according to claim 3 wherein (b) is comprised of a blend of either natural rubber or cis-1,4-polyisoprene and a rubber copolymer of styrene and butadiene.

5. The rubbery adhesive cement according to claim 4 wherein the vulcanizable rubbery polymer blend is comprised of, based on 100 parts thereof:
   (a) 20 to 35 parts by weight of medium-vinyl polybutadiene, and
   (b) a blend comprised of 10 to 35 parts by weight of natural rubber or cis-1,4-polyisoprene and correspondingly 40 to 60 parts by weight of a rubbery copolymer of styrene and butadiene.

6. The rubbery adhesive cement according to claim 5 wherein the vulcanizable rubbery polymer blend is comprised of, based on 100 parts thereof:
   (a) 25 parts by weight of medium-vinyl polybutadiene and
   (b) a blend comprised of 20 parts by weight of natural rubber or cis-1,4-polyisoprene and 55 parts by weight of a rubbery copolymer of styrene and butadiene.

7. The rubbery adhesive cement according to claim 6 wherein the medium-vinyl polybutadiene has a Mooney viscosity of 80 to 150 ML4 at 100° C. prior to oil extension.

8. The rubbery adhesive cement according to claim 7 wherein the medium-vinyl polybutadiene has a Mooney viscosity of 90 to 130 ML4 at 100° C. prior to oil extension.

9. The rubbery adhesive cement according to claim 8 wherein the medium-vinyl polybutadiene has a Mooney viscosity of 95 to 125 prior to oil extension.

10. The rubbery adhesive cement according to claim 7 wherein the medium-vinyl polybutadiene is extended with 20 to 50 parts by weight of processing oil per 100 parts by weight of medium-vinyl polybutadiene.

11. The rubbery adhesive cement according to claim 10 wherein the medium-vinyl polybutadiene is extended with 30 to 45 parts by weight of processing oil per 100 parts by weight medium-vinyl polybutadiene.

12. The rubbery adhesive cement of claim 1 wherein the vulcanizable rubbery polymer blend is reinforced with carbon black.

13. The rubbery adhesive cement of claim 1 wherein the rubbery conjugated diene polymer having 25% to 55% side chain unsaturation is provided by the base polymer of an oil extended rubbery conjugated diene polymer having 25% to 55% side chain unsaturation.

* * * * *